No. 617,591. Patented Jan. 10, 1899.
E. A. MILLER & T. E. CHRISTMAN.
HOSE COUPLING.
(Application filed Mar. 3, 1898.)
(No Model.)
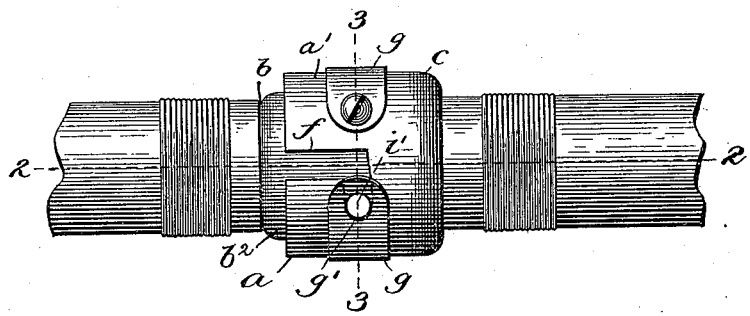
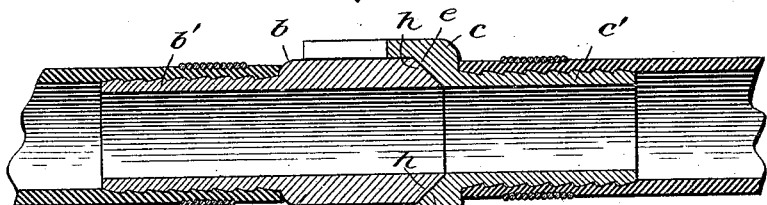
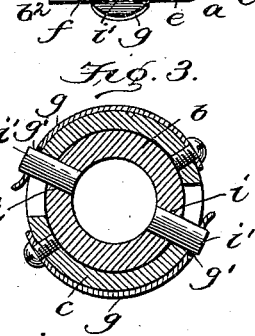
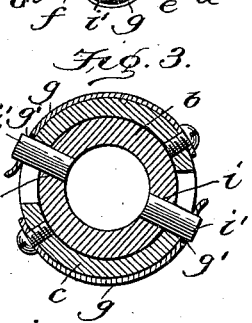
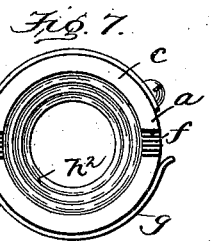
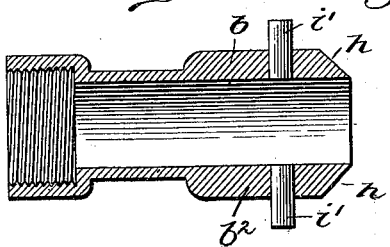
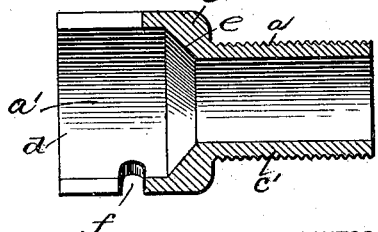
WITNESSES:
Edwin L. Bradford
C. C. Hines
INVENTORS
Ernest A. Miller
Theodore E. Christman
BY
R. S. & A. B. Lacey
ATTORNEYS.
THE NORRIS PETERS CO., PHOTO-LITHO., WASHINGTON, D. C.

UNITED STATES PATENT OFFICE.

ERNEST A. MILLER AND THEODORE E. CHRISTMAN, OF JACKSON, MICHIGAN.

HOSE-COUPLING.

SPECIFICATION forming part of Letters Patent No. 617,591, dated January 10, 1899.

Application filed March 3, 1898. Serial No. 672,410. (No model.)

*To all whom it may concern:*

Be it known that we, ERNEST A. MILLER and THEODORE E. CHRISTMAN, citizens of the United States, residing at Jackson, in the county of Jackson and State of Michigan, have invented certain new and useful Improvements in Hose-Couplings; and we do hereby declare the following to be a full, clear, and exact description of the invention, such as will enable others skilled in the art to which it appertains to make and use the same.

This invention relates to certain new and useful improvements in hose-couplings, and has for its object to provide a coupling which may be readily coupled and uncoupled, which is strong and durable, and which combines improved means for effecting a water-tight joint between the parts, together with locking-pins capable of being conveniently removed and replaced by others when mutilated or otherwise injured, so as to prolong the life and enhance the usefulness of the coupling.

To these ends the invention consists of certain novel features of construction and arrangement of parts, which will be hereinafter more fully described, and particularly pointed out in the appended claim.

In the accompanying drawings, Figure 1 is a plan view of our improved coupling connected. Fig. 2 is a longitudinal section thereof on line 2 2 of Fig. 1. Fig. 3 is a transverse section on line 3 3 of Fig. 1. Figs. 4 and 5 are sectional views of a modified form of coupling. Fig. 6 is a detail view similar to Fig. 2, showing the beveled seats of the male and female members. Fig. 7 is an end view of the female member thereof.

Referring now more particularly to the drawings, wherein like letters of reference designate corresponding parts throughout the several views, $a$ and $b$ represent the two members of the coupling, which are of the same internal diameter, the male member $b$ being thickened exteriorly at its inner end to form an enlarged head $b^2$ and adapted to fit within a socket $a'$ upon the inner end of the female member $a$. The end of the male member is beveled at $h$ to facilitate its entrance into the socket, and this beveled portion is provided with a series of annular concentric corrugations $h'$, adapted to pack a washer snugly against a beveled seat $e$, formed upon the inner circumference of the bulged-out base portion $c$ of said socket at its junction with the stem $c'$. By this construction the socket is materially strengthened and a shoulder of sufficient size afforded to allow of the formation of said beveled seat. The beveled seat is also provided with an annular concentric series of corrugations $h^2$, adapted to receive those on the male member, so that the packing-ring or washer inserted therebetween will be crimped and form a series of packed faces acting successively or in turn to prevent the escape of water, and thus providing an absolutely water-tight joint.

The head of the male member is formed with holes $i$ at diametrically opposite sides, and fitted tightly therein solely by frictional contact are locking-pins $i'$, which are adapted to pass within slots $f$ on the socket of the female member, which are nearly right angular in shape, forming bayonet-joints, the portion $f'$ of each slot being inclined to draw the members tightly together. These pins may be made of a metal which is harder and more durable than that of which the coupling is made, if desired, and if broken or otherwise injured may be quickly and conveniently removed by means of a punch and new pins substituted therefor. Ordinarily locking-pins of this character are cast on the coupling member and are liable to be mutilated or broken by contact with stones or other objects when the hose is dragged along the ground, thus rendering said member unfit for further use. Our invention entirely overcomes this objection and prolongs the life of the coupling. The two members of the coupling are held in engagement by spring-straps $g$, secured at one end to the socket of the female member and provided with upturned free ends with openings $g'$ therein to spring over the pins $i'$ and lock them in position.

In Figs. 1 and 2 the members are shown provided with stems $b'$ $c'$, serrated, as usual, for better engagement with the hose, while in Figs. 4 and 5 we have shown the members provided with internal and external threads, respectively, for the proper connection with a hydrant or pipe.

From the foregoing description it will be apparent that to make a joint it is simply necessary to slide the head of the male member into the socket of the female member and the pins in the bayonet-slots until the beveled end $h$ meets the seat $e$, and then give the members a twist to cause the pins to move under the upturned ends of the spring-straps $g$ until the openings $g'$ therein are reached, when the springs snap over the pins and lock them in position. To disconnect, it is only necessary to lift the springs out of engagement with the pins and reverse the former motions.

Having thus described the invention, what is claimed as new is—

A hose-coupling, comprising in its construction a female member composed of a stem having an enlarged socket at the inner end thereof, said socket being provided with bayonet-slots and a bulged-out base portion at its junction with the stem forming a shoulder which is beveled internally to form a seat having an annular concentric series of corrugations, a male member thickened at its inner end to form a head adapted to enter said socket and provided with a beveled extremity formed with a similar series of corrugations to crimp a packing-washer against said seat and thus provide a plurality of packed faces, removable locking-pins fitted solely by frictional contact in openings in the head of the male member and adapted to engage the bayonet-slots, and spring-straps on the female member to engage the pins, substantially as described.

In testimony whereof we affix our signatures in presence of two witnesses.

ERNEST A. MILLER.
THEODORE E. CHRISTMAN.

Witnesses:
GEO. KALMBACH,
CHAS. MINKLER.